US012580663B2

(12) United States Patent
  Che

(10) Patent No.: US 12,580,663 B2
(45) Date of Patent: Mar. 17, 2026

(54) COHERENT DETECTION OF SUBCARRIER-MULTIPLEXED SIGNALS USING A FREQUENCY COMB

(71) Applicant: Nokia Solutions and Networks Oy, Espoo (FI)

(72) Inventor: Di Che, Union, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 252 days.

(21) Appl. No.: 18/476,982

(22) Filed: Sep. 28, 2023

(65) Prior Publication Data

US 2025/0112706 A1 Apr. 3, 2025

(51) Int. Cl.
  *H04B 10/61* (2013.01)

(52) U.S. Cl.
  CPC ......... *H04B 10/6166* (2013.01); *H04B 10/61* (2013.01)

(58) Field of Classification Search
  CPC ............................................... H04B 10/61–65
  See application file for complete search history.

(56) References Cited

U.S. PATENT DOCUMENTS 8,103,166 B2 * 1/2012 Liu ...................... H04B 10/614
  398/43
8,849,130 B2 9/2014 Xie et al.

2010/0310256 A1 * 12/2010 Shpantzer .............. H04B 10/61
  398/74
2013/0177027 A1 * 7/2013 Rasras ................... H04J 14/002
  370/464
2014/0064734 A1 * 3/2014 Witzens ............. H04B 10/6164
  398/79

(Continued)

FOREIGN PATENT DOCUMENTS

CN 112532336 A 3/2021
CN 115833954 A 3/2023
EP 2693664 A1 2/2014

OTHER PUBLICATIONS

M. M. H. Adib et al., "Colorless Coherent TDM-PON Based on a Frequency-Comb Laser", Journal of Lightwave Technology, vol. 49, No. 13, Jul. 1, 2022.

(Continued)

*Primary Examiner* — Nathan M Cors
(74) *Attorney, Agent, or Firm* — Stratford Group Ltd.

(57) ABSTRACT

An optical data receiver is configured for receiving optical signal comprising spectrally adjacent modulated subcarriers. The optical receiver includes an optical comb generator to output separate frequency tones, and a plurality of optical-to-electrical (OE) converters. The OE converters are configured to mix light of a plurality of the frequency tones with part of the received optical signal, and to output a temporal sequence of measurements of the mixture produced by said mixing. A digital signal processor is configured to recover a data stream carried by one of the subcarriers by performing multi-input multi-output (MIMO) processing using the temporal sequences of measurements output by at least two of the OE converters. The MIMO processing involves performing passband filtering for a passband wherein two of the subcarriers are down-converted by the mixing.

17 Claims, 5 Drawing Sheets

(56)          References Cited

U.S. PATENT DOCUMENTS

| | | | |
|---|---|---|---|
| 2016/0191195 A1* | 6/2016 | Magri ................. | H04L 27/2697 398/79 |
| 2018/0006730 A1* | 1/2018 | Kuo .................... | H04J 14/0307 |
| 2018/0227058 A1* | 8/2018 | Han ..................... | H04B 10/615 |
| 2023/0053856 A1* | 2/2023 | Kazama ............... | H04B 10/548 |

OTHER PUBLICATIONS

X. Zeng et al., "Frequency-offset-tolerant optical frequency comb-based coherent transmission for intra-datacenter interconnects," Optics Express, vol. 29, No. 11, May 24, 2021, 17522.
J. K. Fischer et al., "High-Speed Digital Coherent Receiver Based on Parallel Optical Sampling," Journal of Lightwave Technology, vol. 29, No. 4, Feb. 15, 2011.
D. Drayss et al., "Slice-less optical arbitrary waveform measurement (OAWM) in a bandwidth of more than 600 GHz Using Soliton Microcombs,", OFC'2022, paper M2l.1.
H. Wang et al, "Multi-Rate Nyquist-SCM for C-Band 100Gbit/s Signal over 50km Dispersion-Uncompensated Link", Nov. 28, 2011.
D. Welch et al, "Point-to-Multipoint Optical Networks Using Coherent Digital Subcarriers", Journal of Lightwave Technology, vol. 39, No. 16, Aug. 15, 2021.

* cited by examiner 400 mimo pocessing

COHERENT DETECTION OF SUBCARRIER-MULTIPLEXED SIGNALS USING A FREQUENCY COMB

TECHNICAL FIELD

The present disclosure generally relates to optical communications, and more particularly relates to optical receivers for high data rate optical signals.

BACKGROUND

Modern broad-band optical communication systems typically use wavelength division multiplexing (WDM) at a transmitter site and optical coherent detection at a receiver site. Conventionally a "colored", i.e. wavelength-dependent optical receiver is used, with a wavelength de-multiplexer (DEMUX) and a local oscillator (LO) laser that is aligned in frequency to the optical transmitter laser of a particular WDM channel. Such a "colored" receiver typically requires a precise wavelength control for both transmitter and receiver lasers, which increases both the laser cost and energy consumption for cooling and temperature-stabilization of all the wavelength-dependent components in the coherent system. The power consumption issue complicates the dense deployment of coherent systems in datacenters. Wavelength alignment and stabilization requirements at both the optical receiver and transmitter site may be lessened by using an optical frequency comb generator as the optical LO source at the coherent optical receiver. Demodulating a broad-band optical signal using an optical frequency comb as a local oscillator typically requires digital spectral stitching of spectral slices.

SUMMARY

An aspect of the present disclosure provides an apparatus including an optical data receiver. The optical data receiver is configured for receiving an optical signal comprising spectrally adjacent modulated subcarriers. The optical data receiver includes an optical comb generator to output separate frequency tones, and a plurality of optical-to-electrical (OE) converters. Each of the OE converters is configured to mix light of a plurality of the frequency tones with a part of the received optical signal, and to output a temporal sequence of measurements of a mixture produced by said mixing. A digital signal processor is configured to recover a data stream carried by one of the subcarriers by performing multi-input multi-output (MIMO) processing using the temporal sequences of measurements output by at least two of the OE converters. The MIMO processing involves performing passband filtering for a passband wherein two of the subcarriers are down-converted by the mixing. In some embodiments, the MIMO processing includes performing passband filtering for a plurality of adjacent passbands, into which different subsets of the modulated subcarriers are down-converted by the mixing, and parallel MIMO equalization to separately demodulate data streams carried by the different subsets of the modulated subcarriers using the measurements of two or more of the OE converters.

BRIEF DESCRIPTION OF THE DRAWINGS

Embodiments disclosed herein will be described in greater detail with reference to the accompanying drawings which represent example embodiments thereof, in which like elements are indicated with like reference numerals, and wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits may be omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future.

Note that as used herein, the terms "first", "second" and so forth are not intended to imply sequential ordering, but rather are intended to distinguish one element from another, unless explicitly stated. Similarly, sequential ordering of method steps does not imply a requirement of sequential order of their execution, unless explicitly stated. The term "connected" may encompass direct connections or indirect connections through intermediate elements, unless explicitly stated otherwise.

The following abbreviations and acronyms may be used in the present document:

ASIC: application specific integrated circuit

BWL: bandwidth limit

DC: direct current (the zero frequency)
DD: direct detection
DEMUX: demultiplexer
DP: dual polarization
DSP: digital signal processor
IM: intensity modulation
LO: local oscillator
MIMO: multi-input multi-output
Rx: receiver
SCM: subcarrier multiplexing
Tx: transmitter
WDM: wavelength division multiplexing
WSS: wavelength selective switch Various embodiments described below relate to an apparatus, and a corresponding method, in which subcarrier-multiplexed optical signals are coherently detected using an optical frequency comb as a reference.

Figure 1:
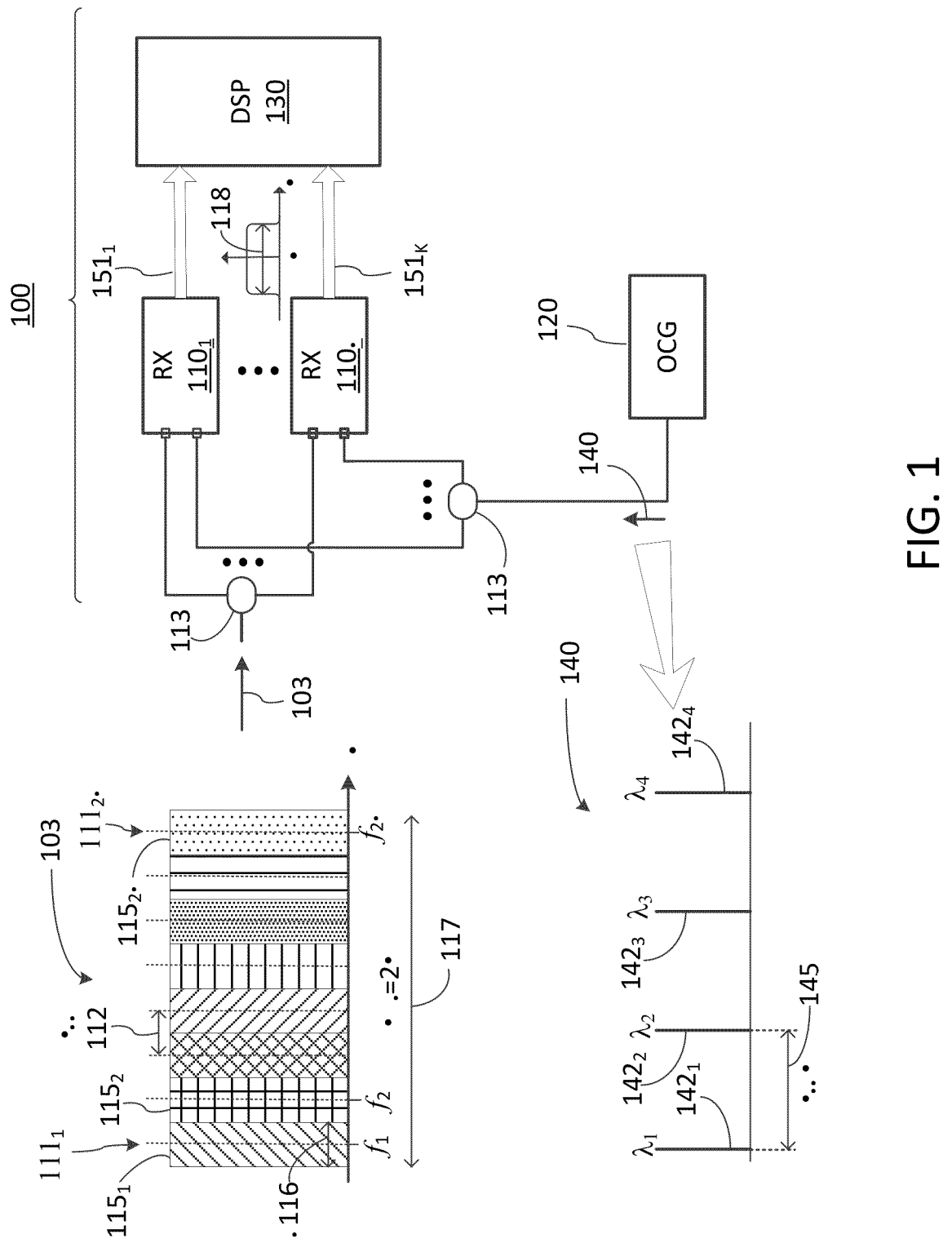
FIG. 1 is a schematic block diagram of a colorless optical data receiver for subcarrier-modulated (SCM) optical signals according to an embodiment.
Figure 6:
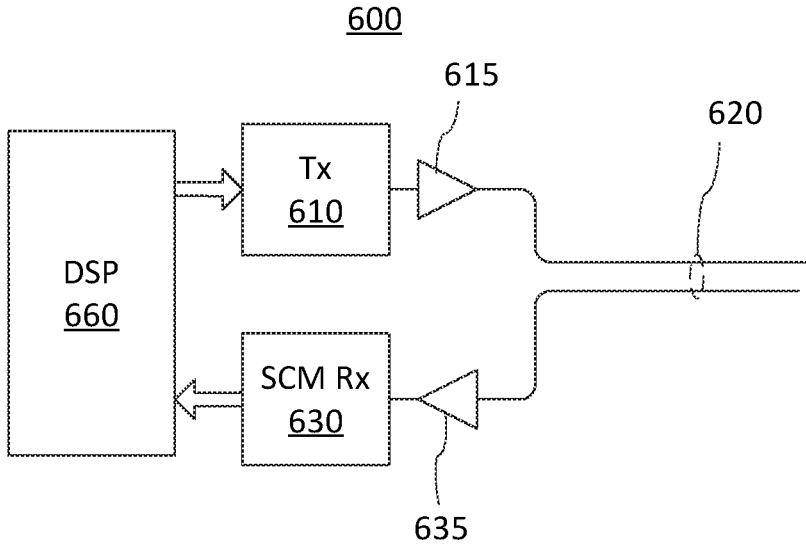
FIG. 6 is a schematic block diagram of a transceiver including an embodiment of the optical data receiver of FIG. 1.

FIG. 1 schematically illustrates an optical data receiver 100 according to an example embodiment. The optical data receiver 100 is configured to receive a subcarrier-modulated (SCM) optical signal 103 comprising a sequence of 2N modulated subcarriers $115_1, \ldots, 115_{2N}$ ("modulated subcarriers $115_n$"), $N \geq 1$. Other embodiments may have an odd number of modulated subcarriers. The modulated subcarriers $115_n$, $n=1, \ldots, 2N$ are schematically illustrated in FIG. 1 for N=4 as differently shaded frequency bins aligned along a horizontal frequency axis. The modulated subcarriers $115_1, \ldots, 115_{2N}$ together occupy a total spectral bandwidth 117 $W_t=2B$, and may form a super-channel of the spectral width $W_t=2B$. The modulated subcarriers $115_1, \ldots, 115_{2N}$ are optical frequency tones $111_1, \ldots, 111_{2N}$ ("subcarrier tones $111_n$") modulated by corresponding modulation signals $F_n(t)$, $n=1, \ldots, 2N$. The subcarrier tones $111_1, \ldots, 111_{2N}$ are narrow-band, typically cw, optical signals centered at corresponding frequencies $f_1, f_2, \ldots, f_{2N}$. The subcarrier tones $111_1, \ldots, 111_{2N}$ are typically approximately evenly spaced in frequency with a subcarrier frequency spacing 112 $f_{SC}=B/N$. The subcarriers $111_1, \ldots, 111_{2N}$ are modulated to a bandwidth $W_c \leq B/N$ per subcarrier ("subcarrier bandwidth"). In the illustrated example, the subcarrier modulation bandwidth We is approximately equal to the subcarrier spacing $f_{SC}=B/N$ for spectral efficiency. In some embodiments, the subcarrier modulation bandwidth We may be somewhat smaller than the $f_{SC}$ 112 (FIG. 6). In some embodiments, different modulated subcarriers may have different bandwidth.

Each of the modulation signals $F_n(t)$, $n=1, \ldots, 2N$, encode a corresponding data stream. In some embodiments, these data streams may be parts of a higher-rate data signal. In some embodiments, these data streams may include information indicating how said data streams are to be assembled at the receiver 100. E.g. the data streams of the modulated subcarriers $115n$ may include preambles indicating a sequence or permutation order of respective data streams in the higher-rate data signal being transmitted, e.g. as integer numbers from 1 to 2N.

The optical receiver 100 includes a plurality of $K \geq 2$ optical-to-electrical (OE) converters $110_1, \ldots, 110_K$, an optical comb generator (OCG) 120, and a digital signal processor (DSP) 130. Each of the OE converters $110_k$, $k=1, \ldots, K$, is configured to receive a part of the received optical signal 103 at a signal input thereof, and mix it with light 140 generated by the OCG 120 ("OCG light 140"). The signal parts received by the OE converters $110_k$ have each the same modulation as the received optical signal 103. The OCG light 140 comprises a sequence ("comb") of optical frequency tones $142_m$, $m=1, 2, \ldots, M$, four of which are schematically shown in FIG. 1. In example embodiments, the optical frequency tones $142_m$ are spread over an optical frequency range exceeding the bandwidth 2B of the received optical signal 103, and are evenly spaced by a comb frequency spacing $f_{LO}$.

The frequency tones $142_m$ are provided to local oscillator (LO) inputs of each of the OE converters $110_k$ as a shared optical frequency reference. Two 1×K optical power splitters 113 may be used to split the received optical signal 103 and the OCG light 140 in power between the K OE converters 110.

The OCG 120 may be any suitable optical comb source configured to generate a comb of frequency tones in a target wavelength range, typically from about 1.3 μm to about 1.6 μm, e.g. in the O-band or C-band of telecommunication wavelengths, and having the tone spacing $f_{LO}$ in a range typically from about 10 GHz to about 500 GHz. E.g., in some embodiments the OCG 120 may be embodied as a mode-locked semiconductor laser, e.g. a quantum dash mode-locked laser diode (QD MLLD); in some embodiments, the OCG 120 may be a Kerr nonlinearity comb, where a single continuous-wave (CW) laser is coupled into a microresonator to generate multiple frequency tones by four-wave mixing; in some embodiments, the OCG 120 may be an EO comb source, using electro-optical (EO) modulation of a CW laser using an RF frequency source.

The light paths from each of the optical splitters 113 to different ones of the OE converters 110 are configured to provide different time delays for the OCG light relative to the SCM light. In a preferred embodiment, the relative time delays $\tau_k$, $k=1, \ldots, K$ are approximately evenly spread within a beat period $T_{LO}=1/f_{LO}$ of the OCG comb signal 140 with a time delay increment $T_{LO}/K$, i.e. approximately as described by equation (1):

$$\tau_k = \frac{(k-1)T_{LO}}{K}. \tag{1}$$

In an example embodiment, the optical signal paths to each of the OE converters 110 are matched, while the OCG signal paths to different ones of the OE converters $110_k$ differ approximately by the corresponding relative time delays $\tau_k$, e.g. in accordance with equation (1).

In example embodiments, the OE converters 110 are dual-polarization (DP) in-phase (I) and quadrature (Q) optical receivers ("IQ receivers") using the frequency tones $142_m$ as a common reference. Known in the art IQ optical receivers configured to receive DP IQ-modulated optical signals may be used. E.g., each of the OE converters 110 may include a DP 90° optical hybrid connected at its outputs to a balanced photodetector (PD) circuit, to provide I and Q electrical PD signals in each of the two polarization paths. The 4K electrical PD signals are digitized by analog-to-digital converters (ADCs), whose outputs are processed by the DSP 130 to recover the data streams carried by the modulated subcarriers. In other embodiments, the OE converters 110 may be single-polarization IQ optical receivers.

In the following, some of the described examples relate to embodiments with K=2, i.e. with the optical receiver 100 having two OE converters $110_1$ and $110_{K=2}$ shown in FIG. 1; extending to embodiments with K>2 is straightforward, as also described herein.

Figure 2A:
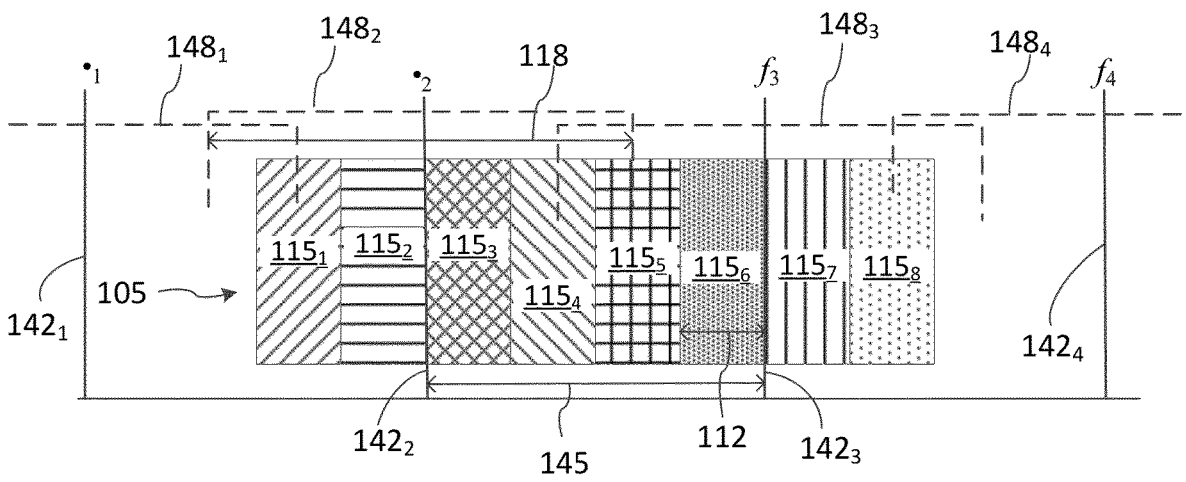
FIG. 2A is a schematic diagram illustrating a symmetric alignment of a received signal spectrum and an optical frequency comb spectrum at the optical data receiver of FIG. 1, with the center of the received signal spectrum aligned with the mid-point between two frequency tones of the comb.
Figure 3A:
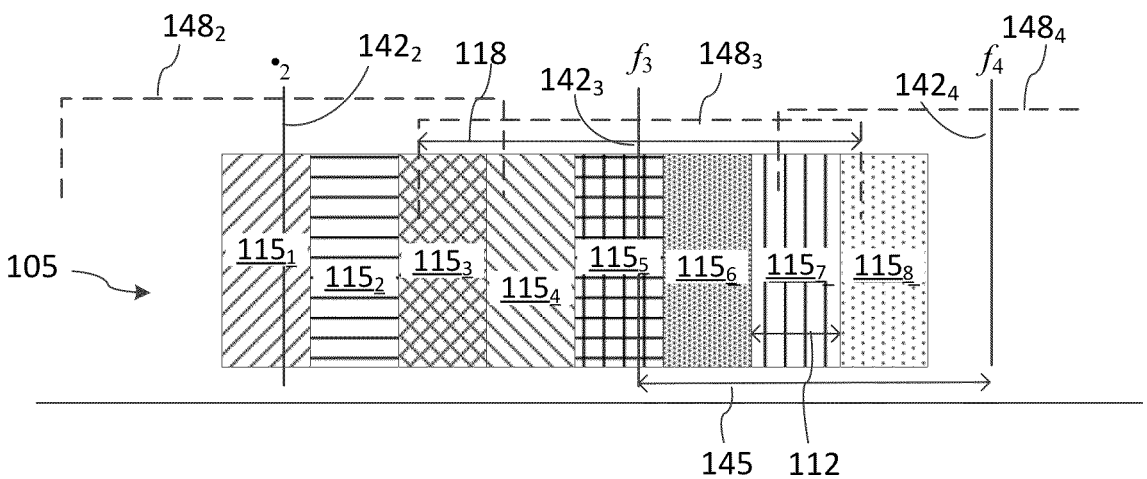
FIG. 3A is a schematic diagram illustrating an example offset alignment of the received signal spectrum and the optical frequency comb, with the center of the received signal spectrum offset by 1.2 subcarrier spacing from the symmetric alignment of FIG. 2A.

The OE converters $110_k$ are configured to down-shift different spectral portions of the received signal 103 (FIGS. 2A and 3A, spectral portions outlined by dashed lines 148)

to an optical detection bandwidth 118 $W_{RXO}$ of the OE converter by mixing ("sampling") said portions with adjacent ones of the OCG tones 142$_m$, and to convert the down-shifted portions to electrical domain. Each of the OE converters 110$_k$ outputs a temporal sequence of measurements of the received optical signal 103 in the form of digital electrical signals 151$_k$, wherein the down-converted portions of the received optical signal 103 sampled by different ones of the OCG tones 142$_m$ spectrally overlap.

In some embodiments, the number K of the OE converters 110$_k$ in the optical receiver 100 is such that their aggregate optical detection bandwidths, $K \cdot W_{RXO}$, is at least equal to or, preferably, somewhat exceeds the bandwidth $W_r = 2B$ of the received SCM signal 103. In some embodiments, the optical detection bandwidth 118 $W_{RXO}$ of each of the OE converters is selected to be at least equal to or, preferably, somewhat exceeds the bandwidth $W_r = 2B$ of the received SCM signal 103 divided by the number K of the OE converters 110:

$$W_{RXO} = 2B/K + \Delta W \qquad (2)$$

where $\Delta W$ is an excess bandwidth to accommodate a frequency drift of the OCG comb signal 140 relative to the SCM signal 103. The optical detection bandwidth $W_{RXO}$ 118 preferably exceeds somewhat the OCG tone spacing 145 $f_{LO}$. In some preferred embodiments, the excess bandwidth $\Delta W \cong f_{SC}$, such that the Rx optical bandwidth $W_{RXO}$ 118 covers one K-th fraction of the SCM spectrum 105, plus one additional modulated subcarrier 115:

$$W_{RXO} \cong 2B/K + f_{SC}, \qquad (3)$$

For embodiments with two OE converters 110, i.e. K=2, the optical detection bandwidth 118 may be expressed by equation (4):

$$W_{RXO} = (1 + \beta) \qquad (4)$$

where parameter $\beta$ is an "excess bandwidth" factor of the OE converter. To cover one additional modulated subcarrier 115$_n$, $\beta$ should be approximately equal to K/2N, so that for K=2

$$W_{RXO} = (1 + 1/N) \cdot B = B + f_{SC}, \qquad (5)$$

and the optical detection bandwidth 118 of each of the OE converters 110 covers (N+1) modulated subcarriers 115.

In some embodiments, the optical detection bandwidth 118 $W_{RXO}$ of the OE converters may exceed the value given by equation (3), or equation (5) for K=2, at the expense of lower bandwidth efficiency. For values of the excess bandwidth smaller than $f_{SC}$, some of the subcarriers 115 may not be detected intactly by one tone 142. Such subcarriers may be detected partially by two tones 142, which requires spectrum stitching, as explained below, to combine the two parts as an intact subcarrier.

According to the Nyquist theorem, the minimum electrical receiver bandwidth $W_{RXE}$ of each of the OE converters

110 is one half of the optical detection bandwidth 118, i.e. $W_{RXE} \geq W_{RXO}/2$, or for K=2

$$W_{RXE} \geq (1 + 1/N) \cdot B/2 \qquad (6)$$

E.g., in some embodiments the OE converters 110 may use ADCs with a sampling rate equal to the optical detection bandwidth $W_{RXO}$. In some embodiments, the DSP 130 may be configured to digitally filter the digitized electrical signals 151$_k$ with a low-pass filter having the desired electrical Rx bandwidth, e.g. as given by the right-hand sided of equation (6) for K=2.

The digital electrical signals 151$_k$ from each of the OE converters 110$_k$ are provided to the DSP 130 for multi-input multi-output (MIMO) processing to demodulate the data streams carried by each of the modulated subcarriers 115$_n$. The processing may include using a MIMO equalization algorithm, e.g. with multiple instances thereof executed in parallel, to separately demodulate the data streams carried by different subsets of two or more of the modulated subcarriers 115$n$ based on the electrical outputs 151$_k$ of two or more of the OE converters 110$_k$.

The MIMO equalization algorithm may be as used in coherent optical receivers to separate polarization tributaries of polarization-multiplexed signals, or may be a straightforward extension of those MIMO equalization algorithms to a bigger input/output dimension. In some embodiments, the DSP 130 includes a 2M×2M MIMO equalizer configured to use outputs of M≥2 of the OE converters 110$_k$ to de-multiplex polarization tributaries of the receiver optical signal 103 and demodulate M subcarrier signals carried by said tributaries, the M subcarrier signals being a subset of the modulated subcarriers 115$_n$ that are down-converted to a same frequency passband (e.g. 221$_n$, FIG. 2B or 3B) by the mixing with different OCG tones 142$_m$. MIMO equalizers typically used in DSPs of coherent DP optical receivers for polarization de-multiplexing may be configured to perform this function.

In some embodiments, the optical data receiver 100 is configured so that different subsets of the modulated subcarriers 115$n$ contribute into different non-overlapping or weakly overlapping slices of a detected signal spectrum obtained by the DSP 130 for each of the OE converters 110$_k$. In such embodiments, the DSP 130 is configured to identify the locations of said slices ("passbands") in a signal spectrum obtained for each of the OE converters 110$_k$, and to use the MIMO equalization to separately demodulate the data streams carried by the modulated subcarriers 115$_n$ of each of the subsets based on the output signals of the two or more of the OE converters.

FIGS. 2A and 3A illustrate two example alignments of four frequency tones 142$_m$, m=1, . . . , 4, of the optical comb signal 140 relative to the SCM optical signal spectrum 105. In the illustrated examples, the frequency tone spacing 145 $f_{LO}$ of the OCG light 140 is selected to be approximately equal to an integer multiple of the subcarrier spacing 112 $f_{SC} = B/N$ of the optical SCM signal 103:

$$f_{LO} = m \cdot f_{SC}, \qquad (6)$$

where m is an integer greater than 1. "Approximately" here means that the spacing 145 $f_{LO}$ may deviate from the value given by the right-hand side (RHS) of equation (6), with the deviation preferably being within a subcarrier gap 511 (FIG. 5) times m, or within +\−10% of the RHS of eq. 6 in some embodiments. As described below with reference to FIGS. 2B and 3B, having the frequency tone spacing 145 $f_{LO}$ to be approximately equal to an integer multiple of the subcarrier spacing 112 $f_{SC}$ may align the down-converted products of mixing of different modulated subcarriers 115$_n$ with different ones of the tones 142$_k$ in the detected signal spectrum. Advantageously, this alignment enables demodulating the data signals carried by the modulated subcarriers 115$_n$ without requiring digital spectral stitching. In the absence of such alignment, which is preferred but not necessary, the data signals carried by the modulated subcarriers 115$_n$ may still be de-modulated following approaches described herein and using digital spectral stitching.

Figure 3B:
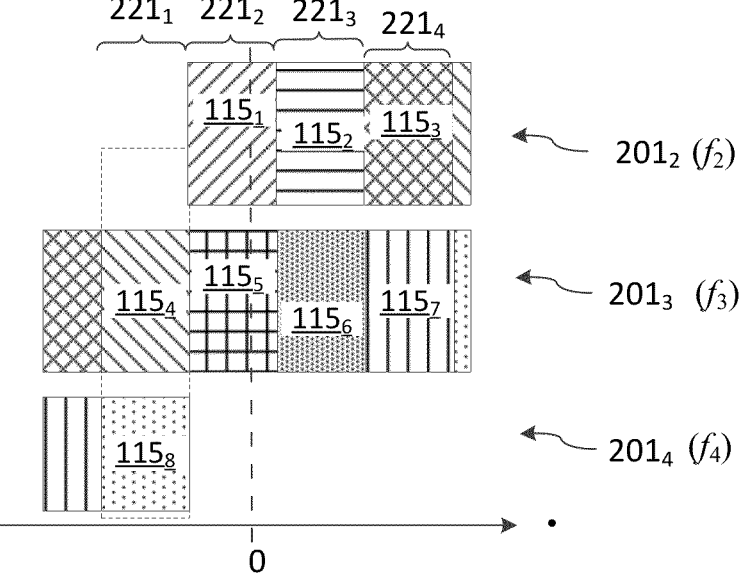
FIG. 3B is a schematic diagram illustrating the spectra of down-converted beat products of mixing the received signal with the different frequency tones of the OCG comb for the offset alignment of FIG. 3A.

In the example of FIG. 2A, the two middle frequency tones 142$_2$ and 142$_3$ are symmetrically located at opposite sides of a center wavelength of the SCM spectrum 105. With the comb spacing 145 being an integer multiple of the subcarrier spacing 112, the frequency tones 142$_2$ (optical frequency $f_2$) and 142$_3$ (optical frequency $f_3$) are aligned with inter-subcarrier boundaries in the SCM spectrum 105, e.g. the boundary between modulated subcarriers 115$_2$ and 115$_3$, and the boundary between modulated subcarriers 115$_6$ and 115$_7$, respectively. In the example of FIG. 3A, the two middle tones 142$_2$ and 142$_3$ are shifted by 1.2 subcarrier spacing $f_{SC}$ 112 relative to the symmetrical alignment of FIG. 2A, as an example of OCG frequency drift. In this case, the frequency tones 142$_2$ and 142$_3$ are no longer aligned with any of the modulated subcarriers boundaries. Nevertheless, different ones of the modulated subcarriers are still spectrally aligned, pair-wise in this example, in the down-converted spectrum (FIG. 3B).

The OCG tone spacing 145 of the comb may also be approximately equal to the total optical bandwidth $W_t=2B$ of the SCM signal 103 divided by the number of coherent receivers K:

$$f_{LO} \cong W_t/K = 2B/K, \qquad (7)$$

e.g. $f_{LO}=B$ for K=2. In embodiments where $W_t/K$ is not an integer multiple of $f_{SC}$, $f_{LO}=\lceil W_t/(K \cdot f_{SC}) \rceil \cdot f_{SC}$, where $\lceil a \rceil$ denotes a smallest integer that is bigger than a (ceiling of a).

Each of the OE converters 110 down-convert (in frequency) mixing products of the SCM spectrum 105 with each of the four frequency tones 142 within the optical detection bandwidth 118 $W_{RXO}$; in FIGS. 2A and 3A, the corresponding detection frequency bands for each of the four frequency tones 142$_m$ are indicated with dashed lines 148$_m$. Typically, each of the OE converters 110 is an IQ optical receiver, which performs in-phase (I) and quadrature (Q) measurements of the mixing products and outputs temporal sequences of the I and Q measurements (streams of "I" and "Q" signal samples) as digital electrical signals 151$_k$. The DSP 130 processes these streams, e.g. as typically done in conventional optical IQ receivers, to form a complex digital signal. This complex digital signal (or two complex signals for DP IQ receivers) has a spectrum in the baseband that is centered at DC (zero frequency), as may be computed, e.g. using FFT processing.

Figure 2B:
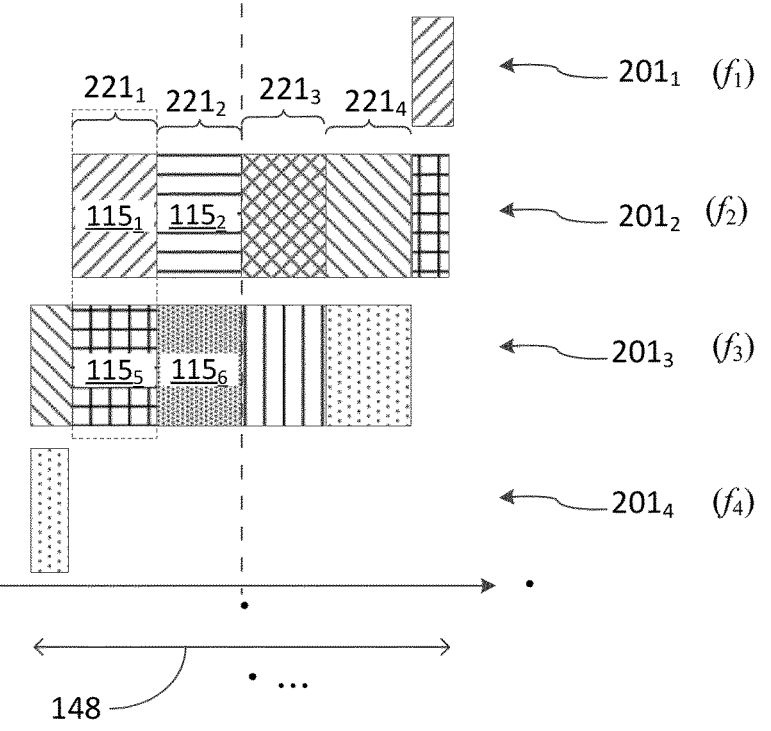
FIG. 2B is a schematic diagram illustrating the spectra of down-converted products of mixing the received signal with different frequency tones of the frequency comb for the symmetric alignment of FIG. 2A.

FIGS. 2B and 3B schematically illustrate the spectra of the corresponding down-converted signals 201$_1$, . . . , 201$_4$ versus frequency f corresponding to the OCG comb alignments of FIGS. 2A and 2B, respectively. Spectra 201$_m$, m=1, 2, 3, or 4, are approximately portions of the spectrum 105 of the SCM optical signal 103, outlined by corresponding passbands 148$_m$ of width $W_{RXO}$ 118, down-converted to baseband by mixing with corresponding ones of the OCG tones 142$_m$. The spectra 201$_1$, . . . , 201$_4$ are shown as being vertically offset for clarity, but overlap within same signal streams in corresponding frequency ranges, e.g. 221$_1$ to 221$_4$. Same shading in FIGS. 2A, 2B, 3A, and 3B indicate same modulated subcarriers 115$_n$. Different subsets of the modulated subcarriers 115$_n$ (different pairs, in this example) are down-converted into different ones of the frequency ranges 221$_m$, m=1, . . . , 4 ("passbands 221$_m$"). By way of example, for the OCG tone alignment of FIGS. 2A and 2B, a frequency range 221$_1$ includes an additive superposition of the down-shifted spectra of the modulated subcarriers 115$_1$ and 115$_5$ with no or little contribution from other modulated subcarriers. For the alignment of FIGS. 3A and 3B, a slice of the detected electrical signal within a (somewhat shifted) frequency range 221$_1$ (FIG. 3B) includes an additive superposition of down-converted spectra of another pair of the modulated subcarriers, 115$_4$ and 115$_8$ in this example, with no or little contribution from other modulated subcarriers. Once an offset of the frequency tones 142 relative to a center of the SCM spectrum 105 is determined, the frequency ranges 221$_m$ of overlapped subcarriers may be identified, and corresponding superimposed subcarrier signals extracted by pass-band filtering ("spectral slicing") within the detected frequency ranges ("passbands") 221$_m$. The subcarrier modulation signals of each of the overlapping subcarriers of the subset may then be separated based on the corresponding signals obtained from the outputs 151 of the two different OE converters 110, using MIMO equalization. In the illustrated example, each of the passbands 221$_m$ includes overlapping spectra of two of the modulated subcarriers; in embodiments where K>2 OE converters 110$_k$ is used to down-convert all the modulated subcarriers of the received optical signal 103, K modulated subcarrier signals may be down-converted to one of the passbands 221$_m$.

Figure 4:
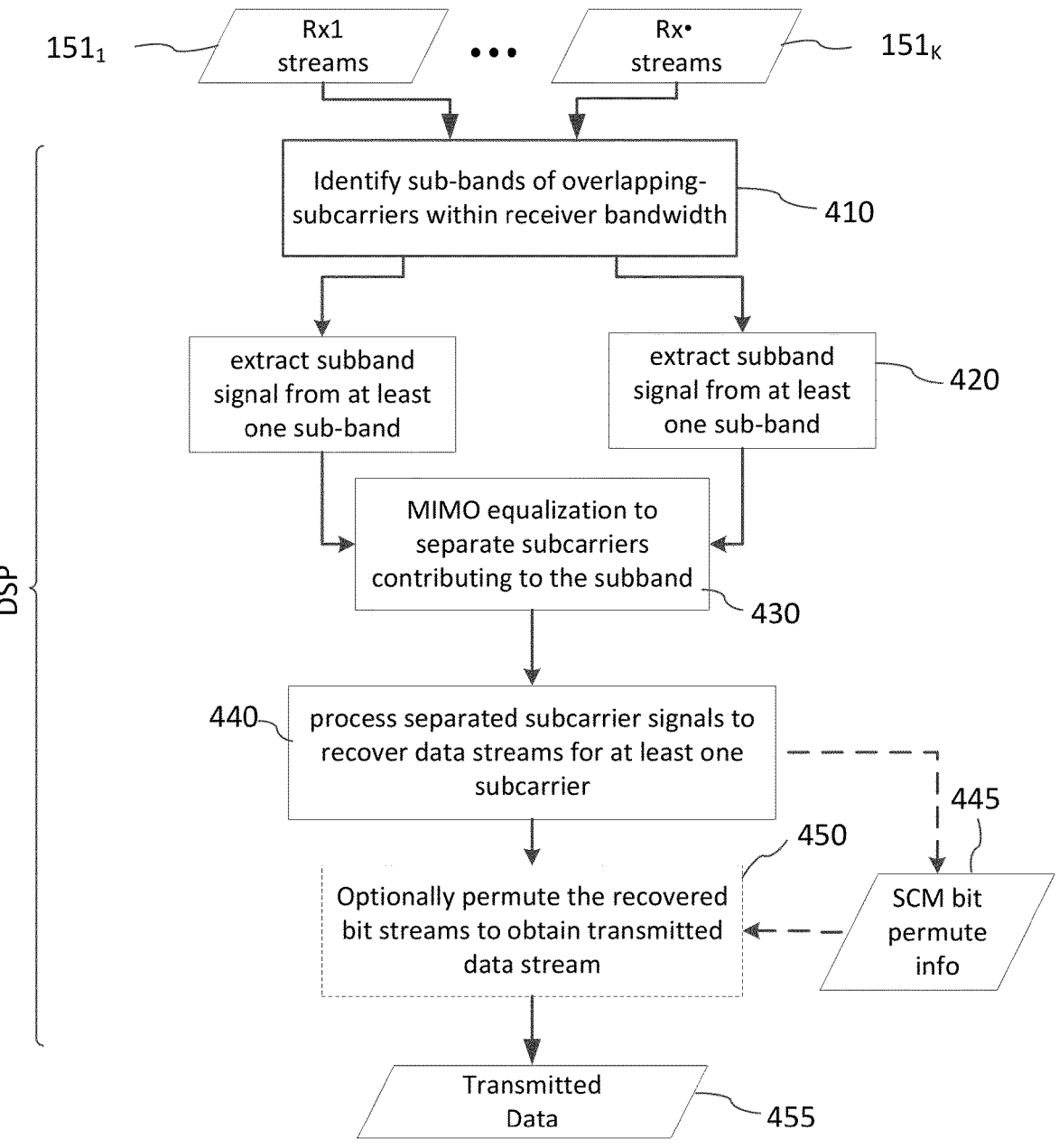
FIG. 4 is a flowchart illustrating various signal processing operations to extract subcarrier data streams by MIMO processing of outputs of the OE converters of the optical data receiver of FIG. 1.

FIG. 4 illustrates example signal processing blocks of MIMO signal processing 400 that may be implemented by the DSP 130 to recover the data streams carried by the modulated subcarriers 115$_n$ from the output signal streams 151$_1$, . . . , 151$_k$ of the OE converters. In the example described below, the optical receiver 100 includes two OE converters 110$_k$, i.e. K=2, each of which being a DP IQ optical receiver. An extension to embodiments with K>2, and/or to receivers without polarization demultiplexing, will be evident to a skilled reader based on the present description.

In the example embodiment, the DSP 130 receives two digital signal streams 151$_1$ and 151$_{K=2}$, each of which including two pairs of digital IQ signals, one IQ signal pair for each of two orthogonal polarization tributaries of the received SCM optical signal 103. The DSP 130 may be configured to combine the I and Q signal streams for each of the polarizations into a single complex signal stream $C_{X(Y)}$ $(t_i)=(I_{X(Y)}(t_i)+j \cdot Q_{X(Y)}(t_i)$, where $t_i$ denotes sampling times and $j=\sqrt{(-1)}$, and the subscripts "X" and "Y" denote the two polarization tributaries; here the expression "X(Y)" indicates one of "X" or "Y". The DSP 130 may perform various signal conditioning operations on the received digital signals 151$_k$ or on the complex signal stream $C_{X,Y}(t_i)$, including but not limited to re-timing and/or chromatic dispersion compensation, as known in the art.

At block 410, the DSP 130 processes the digital signal streams 151$_1$ and 151$_2$, or the complex signal streams $C_{X(Y)}(t_i)$ obtained therefrom, to identify the frequency ranges ("subbands"), e.g. 221$_1$-221$_4$, wherein different subsets of the modulated subcarriers $115_n$ overlap. This may include estimating a frequency offset f offset of one of the OCG tones $142_m$ from a center of the signal spectrum 105; here known methods of LO frequency offset estimation may be used; e.g. a fourth-power estimator, or a phase increment estimator, or any other suitable frequency offset estimator. The boundaries of the frequency ranges $221_m$ may then be estimated based on the estimated frequency offset f offset and the subcarrier spacing $f_{SC}$, e.g. as $f_{offset}(m)=$ $(f_{offset}±m·f_{SC})$, where m=1, . . . , for an even number of modulated subcarriers in the SCM signal 103.

At block 420, the DSP 130 applies digital passband filters with frequency passbands set to the subbands identified at 410, e.g. the subbands $221_m$ (FIGS. 2B and 3B) to extract corresponding passband signals $S_m(t)$, m=1, . . . , M, each of the $S_m(t)$ comprising a linear superposition of a pair (or, generally, up to K) of the modulated subcarriers $115_n$ with subcarrier indices of the corresponding pairs m and m+1. In the described example with 2N=8 modulated subcarriers, $l=f_{LO}/f_{SC}=4$. (FIGS. 2B, 3B). The passband filtering may include slicing the detected signal spectrum at frequencies $f_{offset}(m)$ defining the boundaries of the subbands $221_m$. The passband signals $S_m(t)$ may then be down-converted to the baseband.

In the example embodiments where the OE converters $110_k$ are DP IQ optical receivers, the passband signal $S_m(t)$ is extracted separately for each of the two polarization tributaries for each of the EO converters $110_k$, resulting in $2·K=4$ signals $S_{m,k,P}(t)$ for each subset (pair) of the overlapping subcarriers (each passband $221_m$); here the subscript k=1, 2 denotes one of the EO converters $110_k$, and the subscript "P" refers to one of the two polarization tributaries being de-multiplexed, commonly denoted as "X" and "Y".

At block 430, modulation signals for a first pair of subcarriers, e.g. $115_4$ and $115_8$, are extracted by applying a 4×4 MIMO equalizer to outputs of the passband filtering in a first passband, e.g. $221_1$, to the signals detected for each of the two OE converters in two polarizations. The corresponding four passband signals $S_{m,k,P}(t)$, m=1, are passed as inputs to the 4×4 MIMO equalizer, which performs polarization de-multiplexing and separation of the subcarrier modulation signals for the two overlapped subcarriers, e.g. $115_4$ and $115_8$ (FIG. 3B). Subcarrier modulation signals for a second pair of subcarriers, e.g. $115_1$ and $115_5$, may be extracted by applying a second instance of the 4×4 MIMO equalizer to respective outputs of the passband filtering for a second passband, e.g. $221_2$ in the example of FIG. 3B. The MIMO processing at block 430 may be performed for all M=4 subsets (pairs in the described example) of the overlapping subcarriers, e.g. by applying it, e.g. in parallel, to outputs of the passband filtering in the M=4 passbands $221_m$ at block 420. The MIMO equalizer used in block 430 may be configured to simultaneously separate the transmitted polarizations and the subcarrier modulation signals of the overlapped subcarriers for each of the transmitted polarizations. The DSP 130 may use MIMO equalization techniques known in the art to automatically track channel/transceiver dynamics, including but not limited to polarization variations in the fiber link, potential phase mismatch among the modulated subcarriers $115_n$, e.g. in embodiments wherein the subcarriers are combined in a SCM superchannel at the optical transmitter 110.

At block 440, the DSP 130 may process one or more of the separated subcarrier signals to recover the data streams carried by each, or at least one, of the subcarriers. In some embodiments, e.g. wherein same data streams are carried by corresponding subcarriers in both polarizations of the SCM optical signal 103, the DSP may first combine the corresponding subcarrier modulation signals obtained for the two polarizations into one subcarrier signal. The subcarrier signals may then be de-modulated to recover the corresponding transmitter-generated data streams carried by each, or at least one, of the subcarriers. In some embodiments, the DSP 130 may output one or more of the recovered subcarrier data streams as transmitted data 455. In some embodiments, the DSP 130 may process the data streams to extract information 445, e.g. from preambles thereof, indicating how the recovered subcarrier data streams are to be combined at block 450 to recover the transmitted data 455.

The DSP 130 may perform various signal processing operations other than those described above, such as those typically performed by a DSP of conventional DP IQ optical receivers. Such operations may include, but are not limited to, time recovery, fiber impairments compensation, equalizations (other than the MIMO) of the received signal streams, carrier frequency/phase recovery, and various decoding operations on recovered bit streams, such as e.g. forward error correction (FEC) decoding.

In embodiments where the OCG tone spacing $f_{LO}$ is intended to be set according to equation (6), the $f_{LO}$ may still somewhat deviate from an exact integer multiple of the subcarrier spacing $f_{SC}$; e.g. the $f_{LO}$ may be synchronized to a receiver clock, while the $f_{SC}$ may be synchronized to a transmitter clock, which may somewhat deviate from each other. In some embodiments, the subcarrier frequency mismatch may be at least partially corrected by carrier recovery processing in the DSP 130, as conventionally performed in DSPs of coherent optical receivers. E.g., the MIMO equalization block 430 may include a digital phase locked loop (PLL) to correct for the $f_{SC}-f_{LO}$ frequency mismatch.

Figure 5:
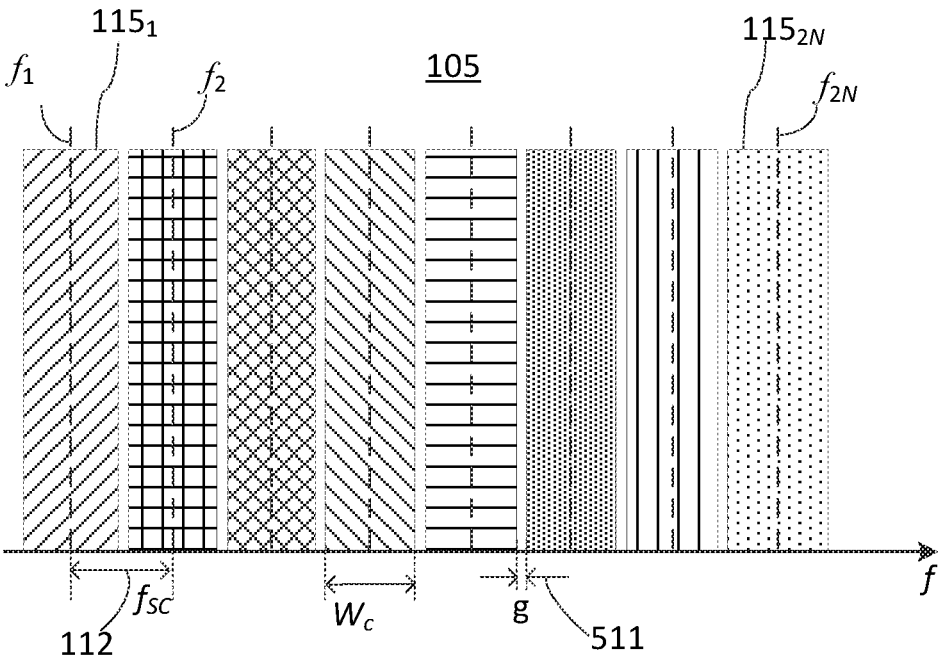
FIG. 5 is a schematic diagram of the spectrum of an optical SCM signal with inter-subcarrier gaps, which may be used in the system of FIG. 1.

Deviations of the $f_{LO}$ from an integer multiple of the $f_{SC}$ may also result in a crosstalk between adjacent modulated subcarriers in embodiments wherein $W_c=f_{SC}$; e.g. the frequency band $221_2$ in FIG. 3B, in addition to the overlapped subcarriers $115_1$ and $115_5$, may include contributions from one or more of the modulated subcarriers that are adjacent to one of the $115_1$ and $115_5$, e.g. one or more of the modulated subcarriers $115_2$, $115_4$, $115_6$, $115_8$, in the example of FIGS. 2A and 2B. In order to prevent or at least reduce this cross-talk, in some embodiments the SCM optical spectrum 105 may include gaps 511 of width $g=(f_{SC}-W_c)>0$ between adjacent ones of the modulated subcarriers $115_n$, n=1, . . . , 2N, as schematically illustrated in FIG. 5. The inter-subcarrier gap width g may be, e.g., at least equal to a maximum expected value of the clock miss-match between the optical transmitter 110 and the optical receiver 100. The inter-subcarrier gap width g 511 may be further chosen to accommodate the subcarrier frequency roll-off at the subcarrier spectral edges; such frequency roll-offs may be, e.g., due to a finite length of a digital filter shaping the modulation spectrum of the subcarrier at the transmitter. In some embodiments, the gap width g 511 is selected to be at least 10 times smaller than the signal bandwidth $W_c$ of each of the modulated subcarriers, for the sake of spectral efficiency. In other embodiments, the gap width g 511 may be larger. By way of example, the subcarrier signal bandwidth We may be in a range from 1 GHz to 50 GHz, while the inter-subcarrier gap g may be in a range from 10 MHz to 1 GHz.

FIG. 6 schematically illustrates an optical transceiver 600 according to an embodiment. The optical transceiver 600 includes an optical transmitter (Tx) 610 to transmit optical signals into an optical fiber line 620, and an optical receiver (Rx) 630 to receive optical signals from the optical fiber line 620. A DSP 660 is configured to generate signals to be transmitted with the Tx 610, and to process output signals of the Rx 630. Optical amplifiers 615 and 635 may be provided to boost the optical signals received from the optical fiber line 620, and to pre-amplify signals generated by the Tx 610. The optical receiver 630 is an embodiment of the optical receiver 100 described above, i.e. is configured to down-convert received SCM optical signals using an optical comb generator as a local oscillator, and the DSP 660 configured to process the output signals of the Rx 630 as described above.

In some embodiments, e.g. when the optical transceiver 600 resides in an optical network unit (ONU) of a passive optical network (PON), the optical Tx 610 may be a single-channel transmitter. In some embodiments, e.g., wherein the optical transceiver 600 is at a node of a broadband optical network or used for high-data rate communications in a data center, the optical Tx 610 may be an SCM optical signal transmitter configured to generate SCM optical signals such as the SCM optical signal 103 described above. In such embodiments, the optical Tx 610 may generate the modulated subcarriers of an SCM signal, e.g. such as the modulated subcarriers 115*n* of the SCM optical signal 103, by modulating, and then wavelength multiplexing, 2N light beams of corresponding optical frequencies, e.g. from 2N different light sources or an optical comb source, or by modulating light from a single cw light source with a digitally-generated electrical SCM signal, e.g. using a digital SCM ("DSCM") method known in the art. In the wavelength-multiplexing embodiments with different light sources, the light sources do not have to be phase-locked, nor their modulation synchronized. In some embodiments, the optical Tx 610 may use one or more dual-polarization (DP) in-phase and quadrature (IQ) modulators (DP IQM) to generate the optical SCM signal, e.g. such as signal 103, with same IQ modulated subcarriers in each of two orthogonal polarizations thereof.

For high-end coherent transceivers, example embodiments described provide a multi-channel optical receiver that does not require an optical filter, DEMUX, or WSS to separate WDM channels. This may simplify integration of multiple coherent receivers, as integrating widely-tunable optical filters, e.g., to cover the full C-band, in a same chip with an Rx optical front end is non-trivial. In commercial coherent transceivers, it has been a common practice to integrate two sets of DSP on one ASIC chip to detect two wavelength channels. With a colorless optical receiver as described above, it may become possible to co-integrate a colorless multi-channel optical Rx frontend and a multi-channel DSP ASIC.

Furthermore, optical receivers such as described may be tolerant to frequency drifts of the LO comb source, and thus may not require cooling. This may be attractive for lower-cost coherent applications, such as e.g. for datacenter connectivity, where cooling power consumption has become a major concern.

For point-to-multipoint transmission applications, such as e.g. PON, using the colorless receiver as described above may allow having a free-running laser at an arbitrary wavelength, provided that the wavelength falls into the frequency range of the receiver-side OCG, which may greatly reduce the cost and power consumption of end users.

An example embodiment described above, e.g. in the summary section and with reference to any one or more of the FIGS. 1-6, provides an apparatus. The apparatus comprises an optical data receiver (e.g. 100, FIG. 1) to receive an optical signal (e.g. 103) comprising spectrally adjacent modulated subcarriers (e.g. 115$_1$, ..., 115$_{2N}$). The optical data receiver comprises an optical comb generator (e.g. 120) to output separate frequency tones (e.g. 142$_1$, ..., 142$_4$), a plurality of optical-to-electrical (OE) converters (e.g. 110$_1$, ..., 110$_K$), and a digital signal processor (DSP) (e.g. 130, 660). Each of the plurality of OE converters is configured to mix light of a plurality of the frequency tones with part of the received optical signal and to output a temporal sequence of measurements (e.g. 151$_1$, 151$_K$) of the mixture produced by said mixing. The DSP configured to recover a data stream carried by one of the subcarriers (e.g. 115$_1$) by performing MIMO processing using the temporal sequences of measurements (e.g. 151$_1$, 151$_K$) output by two of the OE converters (e.g. 110$_1$ and 110$_K$). The MIMO processing involves performing passband filtering for a first passband (e.g. 221$_1$, FIG. 2B), two of the subcarriers (e.g. 115$_1$ and 115$_5$, FIG. 2B) being down-converted to the first passband by the mixing.

In some implementations, the MIMO processing involves performing passband filtering for a second passband (e.g. 221$_2$, FIG. 2B), two others of the subcarriers (e.g. 115$_2$ and 115$_6$, FIG. 2B) being down-converted to the second passband by the mixing. In some of such implementations, the first and second passbands may be spectrally adjacent. In some of such implementations, the first and second passbands may be separated by a gap (e.g. 511, FIG. 5).

In any of the above implementations, the DSP may be configured to recover data streams carried by at least 4 of the modulated subcarriers (e.g. 115$_1$, 115$_2$, 115$_5$, and 115$_6$); and the subcarriers (e.g. 111$_1$, to 111$_{2N}$, FIG. 1) have about the same subcarrier spectral spacing (e.g. 112, FIGS. 1 and 5).

In any of the above implementations, the frequency tones may have a tone spectral spacing, the tone spectral spacing being an integer times the subcarrier spectral spacing, the integer being greater than one.

In any of the above implementations, the DSP may be configured to perform passband filtering for a plurality of spectrally non-overlapping passbands (e.g. 221$_1$ to 221$_4$, FIGS. 2B and 3B) on signals obtained for the two of the OE converters (e.g. 110$_1$, 110$_K$) from the temporal sequences of measurements (e.g. 151$_1$, 151$_K$), different subsets of the modulated subcarriers (e.g. 115$_1$ and 115$_5$; 115$_2$ and 115$_6$; 115$_3$ and 115$_7$, 1154$_3$ and 115$_8$, FIGS. 2B and 3B) being downconverted by the mixing to different ones of the passbands, and to use MIMO equalization on outputs of the filtering to recover data signals of the subsets.

In any of the above implementations, each of the two OE converters may be a dual-polarization optical receiver, and the DSP may configured to use MIMO equalizers for polarization demultiplexing and for demultiplexing the subcarriers.

In any of the above implementations, the plurality of OE converters may include K OE converters, K≥2, and at least some of OE converters of the plurality of OE converters may have an optical detection bandwidth $W_{RXO}$ (e.g. 118, e.g. FIGS. 1, 2A, 3A) that exceeds a ratio of a modulation bandwidth $W_t$ (e.g. 117, FIG. 1) of the received optical signal (e.g. 103) to K by at least one subcarrier frequency spacing $f_{CS}$ (e.g. 112, e.g. FIGS. 1, 5).

In any of the above implementations, the plurality of OE converters includes K OE converters, K≥2, and an optical detection bandwidth $W_{RXO}$ of at least some of the K OE converters encompasses $1/K_{th}$ of the modulated subcarriers of the optical signal plus one.

In any of the above implementations, the optical data receiver (e.g. 100) may be configured to provide the optical signal and the light of the optical comb generator to different ones of the OE converters with relative time delays that differ by a fraction of a beat period $T_{LO}=1/f_{LO}$ of the optical comb signal, the $f_{LO}$ being a frequency spacing of the tones (e.g. 145, FIGS. 1, 2A, 3A). The fraction may be approximately $1/K$, $K{\geq}2$ being the number of the OE converters in the plurality of OE converters.

In any of the above implementations, each of the two OE converters may be an optical in-phase and quadrature (IQ) receiver. In some of such implementations, the optical IQ receivers are dual-polarization IQ receivers, and the MIMO processing comprises 4×4 MIMO equalization.

In any of the above implementations, the plurality of OE converters may comprise K dual-polarization IQ receivers, and the MIMO processing may comprise 2K×2K MIMO equalization.

In any of the above implementations, the temporal sequence of measurements (e.g. $151_1$, e.g. $151_K$) from each of the two OE converters (e.g. $110_1$, e.g. 110) may comprise in-phase (I) and quadrature (Q) measurements. The MIMO processing may comprise: obtaining a complex signal from the I and Q measurements for each of the two OE converters; pass-band filtering of the complex signals for the first passband (e.g. $221_1$, e.g. FIG. 2B or 3B); and performing MIMO equalization on corresponding outputs of the pass-band filtering for the two OE converters to recover data stream carried by the two of the subcarriers.

In any of the above implementations, each of the two OE converters may be a dual-polarization optical receiver.

In any of the above implementations, at least one OF converter from the plurality of OE converters may be a single-polarization optical receiver.

The examples described above are not intended to be limiting, and many variations will become apparent to a skilled reader having the benefit of the present disclosure. For example, different OE converters may have different optical detection bandwidths. Various embodiments may use different multicarrier modulation schemes, subcarrier modulation formats, serial-to-parallel (S/P) encoding and parallel-to-serial (P/S) decoding methods, different types of optical frequency comb generators. The optical receivers according to the present disclosure may, be configured to operate in other wavelength ranges than described above, with different numbers of OE converters in the receiver, and different types of the OE converters, and use any suitable MIMO algorithm. Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

I claim:

1. An apparatus, comprising:

an optical data receiver to receive an optical signal comprising spectrally adjacent modulated subcarriers, the optical data receiver comprising:

an optical comb generator to output separate frequency tones;

a plurality of optical-to-electrical (OE) converters, each of the OE converters configured to mix light of a plurality of the frequency tones with part of the received optical signal and to output a temporal sequence of measurements of the mixture produced by said mixing;

a digital signal processor (DSP) configured to recover a data stream carried by one of the modulated subcarriers by performing multi-input multi-output (MIMO) processing using the temporal sequences of measurements output by two of the OE converters, wherein the MIMO processing involves performing pass-band filtering for a first passband, two of the modulated subcarriers being down-converted to the first passband by the mixing.

2. The apparatus of claim 1, wherein the MIMO processing involves performing passband filtering for a second passband, two others of the modulated subcarriers being down-converted to the second passband by the mixing.

3. The apparatus of claim 2, wherein the first and second passbands are spectrally adjacent.

4. The apparatus of claim 3, wherein the first and second passbands are separated by a gap.

5. The apparatus of claim 1, wherein the DSP is configured to recover data streams carried by at least 4 of the modulated subcarriers; and wherein the modulated subcarriers have about the same subcarrier spectral spacing.

6. The apparatus of claim 5, wherein at least two of the frequency tones have a tone spectral spacing, the tone spectral spacing being an integer times the subcarrier spectral spacing, the integer being greater than one.

7. The apparatus of claim 6 wherein the DSP is configured to perform passband filtering for a plurality of spectrally non-overlapping passbands on signals obtained for the two of the OE converters from the temporal sequences of measurements, different subsets of the modulated subcarriers being downconverted by the mixing to different ones of the passbands, and to use MIMO equalization on outputs of the filtering to recover data signals of the subsets.

8. The apparatus of claim 1 wherein each of the two OE converters is a dual-polarization optical receiver, and wherein the DSP is configured to use a same MIMO equalizer for polarization demultiplexing and subcarrier demodulation.

9. The apparatus of claim 1 wherein the plurality of OE converters includes K OE converters, $K \geq 2$, and wherein at least some of OE converters of the plurality of OE converters have an optical detection bandwidth $W_{RXO}$ that exceeds a ratio of a modulation bandwidth $W_t$ of the received optical signal to K by at least one subcarrier frequency spacing $f_{CS}$.

10. The apparatus of claim 1 wherein the plurality of OE converters includes K OE converters, $K \geq 2$, and wherein an optical detection bandwidth $W_{RXO}$ of at least some of the K OE converters encompasses $1/K_{th}$ of the modulated subcarriers of the optical signal plus one.

11. The apparatus of claim 1 configured to provide the optical signal and the light of the optical comb generator to different ones of the OE converters with corresponding relative time delays, wherein consecutive ones of the relative time delays differ by a fraction of a beat period $T_{LO}=1/f_{LO}$, the $f_{LO}$ being a frequency spacing of the frequency tones.

12. The apparatus of claim 11 wherein the fraction is 1/K, $K \geq 2$ being the number of the OE converters in the plurality of OE converters.

13. The apparatus of claim 1, wherein each of the two OE converters is an optical in-phase and quadrature (IQ) receiver.

14. The apparatus of claim 13 wherein each of the optical IQ receivers is a dual-polarization IQ receiver, and wherein the MIMO processing comprises 4×4 MIMO equalization.

15. The apparatus of claim 1 wherein the plurality of OE converters comprises K dual-polarization IQ receiver, and wherein the MIMO processing comprises 2K×2K MIMO equalization.

16. The apparatus of claim 1 wherein the temporal sequence of measurements from each of the two OE converters comprises in-phase (I) and quadrature (Q) measurements, wherein the MIMO processing comprises:

obtaining a complex signal from the I and Q measurements for each of the two OE converters;

pass-band filtering of the complex signals for the first passband; and performing MIMO equalization on corresponding outputs of the passband filtering for the two OE converters to recover data stream carried by two of the modulated subcarriers.

17. The apparatus of claim 16 wherein each of the two OE converters is a dual-polarization optical receiver, and wherein the MIMO equalization comprises performing polarization de-multiplexing simultaneously with recovering the data streams carried by the two of the modulated subcarriers.

* * * * *